US010393545B2

(12) United States Patent
Bormann et al.

(10) Patent No.: US 10,393,545 B2
(45) Date of Patent: Aug. 27, 2019

(54) SENSOR UNIT, SENSING AND ANALYSIS DEVICE WITH SUCH A SENSOR UNIT AND MOTOR VEHICLE OR TRAILER THEREWITH AND METHOD FOR PROTECTING AN ANALYZER

(71) Applicant: WABCO GmbH, Hannover (DE)

(72) Inventors: Dirk Bormann, Algermissen (DE); Jens Gröger, Hannover (DE); Hartmut Schappler, Hannover (DE); Marek Swoboda, Garbsen (DE)

(73) Assignee: WABCO GmbH, Hannover (DE)

( * ) Notice: Subject to any disclaimer, the term of this patent is extended or adjusted under 35 U.S.C. 154(b) by 75 days.

(21) Appl. No.: 15/543,018

(22) PCT Filed: Jan. 11, 2016

(86) PCT No.: PCT/EP2016/000030
§ 371 (c)(1),
(2) Date: Jul. 12, 2017

(87) PCT Pub. No.: WO2016/113123
PCT Pub. Date: Jul. 21, 2016

(65) Prior Publication Data
US 2018/0003521 A1    Jan. 4, 2018

(30) Foreign Application Priority Data
Jan. 13, 2015    (DE) .................. 10 2015 000 380

(51) Int. Cl.
*B60R 16/06*    (2006.01)
*G01D 3/032*    (2006.01)
*G01D 3/036*    (2006.01)

(52) U.S. Cl.
CPC ............. *G01D 3/036* (2013.01); *B60R 16/06* (2013.01); *G01D 3/032* (2013.01)

(58) Field of Classification Search
CPC ......... G01D 3/036; G01D 3/032; B60R 16/06
(Continued)

(56) References Cited

U.S. PATENT DOCUMENTS

| 5,777,216 A * | 7/1998 | Van Duyne ............. F02P 9/007 |
| | | 324/378 |
| 7,212,388 B2 | 5/2007 | Wizemann et al. |

(Continued)

FOREIGN PATENT DOCUMENTS

| DE | 9412038 U1 | 10/1994 |
| DE | 19707769 A1 | 9/1998 |

(Continued)

OTHER PUBLICATIONS

International search report for PCT/EP2016/000030, dated Apr. 11, 2016, 3 pages.

(Continued)

*Primary Examiner* — Melissa J Koval
*Assistant Examiner* — Rahul Maini
(74) *Attorney, Agent, or Firm* — Warner Norcross & Judd LLP

(57) ABSTRACT

A sensor unit (2) for a motor vehicle or trailer is disclosed. The sensor unit comprises a sensor measuring arrangement (16) for sensing at least one physical variable, a sensor housing (12) partly or fully enclosing the sensor measuring arrangement (16) and at least two connecting lines (18). The sensor unit (2) with the sensor housing (12) is electrically connectable to a conductive part of the motor vehicle or trailer and the sensor measuring arrangement (16) is connectable to an analyzer (6) via the connecting lines (18). Related methods, a sensing and analysis device, and motor vehicles or trailers including the same are also disclosed.

15 Claims, 4 Drawing Sheets

(58) Field of Classification Search
USPC .......................................................... 324/382
See application file for complete search history.

(56) References Cited

U.S. PATENT DOCUMENTS

| | | | | |
|---|---|---|---|---|
| 7,988,086 | B2* | 8/2011 | Tichborne | G01R 31/025 |
| | | | | 324/72 |
| 9,258,934 | B2 | 2/2016 | Saito | |
| 9,603,237 | B2 | 3/2017 | Stiefel | |
| 9,696,365 | B2* | 7/2017 | Yasukawa | G01R 31/025 |
| 2004/0032246 | A1* | 2/2004 | Motz | G01D 3/036 |
| | | | | 324/117 H |
| 2004/0063294 | A1* | 4/2004 | Durocher | B29C 59/14 |
| | | | | 438/382 |
| 2009/0134864 | A1 | 5/2009 | Hofler et al. | |
| 2009/0251843 | A1 | 10/2009 | Hironaka | |
| 2011/0007929 | A1* | 1/2011 | Rabu | H04R 1/1033 |
| | | | | 381/380 |
| 2014/0362625 | A1* | 12/2014 | Mehringer | H02M 7/219 |
| | | | | 363/127 |
| 2015/0357812 | A1* | 12/2015 | Wiemeyer | A63H 19/24 |
| | | | | 361/54 |

FOREIGN PATENT DOCUMENTS

| | | |
|---|---|---|
| DE | 10152252 A1 | 4/2003 |
| DE | 10357366 A1 | 6/2005 |
| DE | 102006021018 A1 | 11/2007 |
| DE | 112007001369 T5 | 4/2009 |
| DE | 102009023150 A1 | 12/2010 |
| DE | 102012215557 A1 | 3/2014 |
| DE | 112013002746 T5 | 3/2015 |
| EP | 2261091 A2 | 12/2010 |
| JP | 2014099553 A | 5/2014 |
| WO | 2013179785 A1 | 12/2013 |

OTHER PUBLICATIONS

English language abstract and machine translation for DE10357366 (A1) extracted from http://worldwide.espacenet.com database on Jul. 20, 2017, 5 pages.

English language abstract and machine translation for DE19707769 (A1) extracted from http://worldwide.espacenet.com database on Jul. 20, 2017, 4 pages.

English language abstract and machine translation for DE102009023150 (A1) extracted from http://worldwide.espacenet.com database on Jul. 20, 2017, 8 pages.

English language abstract and machine translation for DE9412038 (U1) extracted from http://worldwide.espacenet.com database on Jul. 20, 2017, 6 pages.

English language abstract and machine translation for JP2014099553 (A) extracted from http://worldwide.espacenet.com database on Jul. 21, 2017, 13 pages.

* cited by examiner

SENSOR UNIT, SENSING AND ANALYSIS DEVICE WITH SUCH A SENSOR UNIT AND MOTOR VEHICLE OR TRAILER THEREWITH AND METHOD FOR PROTECTING AN ANALYZER

CROSS-REFERENCE TO RELATED APPLICATIONS

This application is the National Stage of International Application No. PCT/EP2016/000030, filed on 11 Jan. 2016, which claims priority to and all ad-vantages of German Patent Application No. 10 2015 000 380.1, filed on 13 Jan. 2015, the content of which is hereby incorporated by reference.

FIELD OF THE INVENTION

The invention generally relates to a sensor unit and, more specifically, to a sensor unit for installation in a motor vehicle, as well as to a sensing and analysis device comprising the sensor unit and a motor vehicle or trailer therewith. The invention further relates to a method for protecting electronic components of an analyzer that is connected to the sensor unit.

BACKGROUND OF THE INVENTION

Conventionally, sensor units in the form of revolution rate sensors in motor vehicles, for example for an antilock brake system (ABS) of an electronic brake system of a motor vehicle, are used to detect the rotation rate of a wheel and to control associated braking depending on rotary motion and the rotation rate. For this purpose, values measured by the sensor unit are transferred to an analyzer via at least two connecting lines. One such sensor unit is for example featured in DE 10 2006 021 018 B4.

In the wheel area of a motor vehicle, however, electrostatic charging occurs within individual electrically isolated parts of the motor vehicle. The electrostatic charging arises for example through the friction of the tires while travelling. Because the chassis parts, in particular vehicle axles, include no conductive connection to the frame of the vehicle, electrostatic charges cannot be discharged from the vehicle axle, as a result of which there is a continuous raised potential between the vehicle axle and the frame of the vehicle. On exceeding a voltage limit, a flashover of the charge to the nearest electrically conductive part takes place. Such flashovers occur in particular in the region of connecting lines between electrical sensor units and electronic analyzers.

Electric circuits with integrated components, such as those used in analyzers, in particular in control units for electronic brake systems, are however sensitive to large noise voltages that can occur because of electrostatic discharges (electrostatic discharge—ESD) in individual vehicle parts. If such overvoltages occur above an upper tolerance limit of a maximum permissible voltage of the analyzer, the analyzer can be damaged.

In order to protect electrical circuits, such as analyzers in control units, against overvoltages, conventionally overvoltage protection devices, such as direct surge arresters, are used that make an electrically conductive connection between otherwise electrically decoupled vehicle parts and thereby discharge any possible electrostatic charges.

DE 9412038 U1 discloses a device for connecting a sensor to a chassis of a vehicle. The sensor comprises, in addition to two conductive wires that can be connected to an analyzer, a third conductive wire that is connected to ground (GND). For this purpose, the sensor is enclosed by a covering body of non-conducting plastic from which the third conductive wire protrudes. The covering body with the protruding third conductive wire is at least partly enclosed by a further covering body of conductive plastic, wherein the sensor is attached to a wheel mounting via the further covering body such that the wheel mounting is conductively connected to ground via the third conductive wire.

However, such surge arresters require a cost intensive overhead, because an additional line is provided that requires a change from standardized control units and entails greater maintenance effort for the vehicle electronics.

SUMMARY OF THE INVENTION

The present invention provides a sensor unit, a sensing and analysis device comprising the sensor unit and analyzer, a motor vehicle or trailer comprising the sensor unit and/or the sensing and analysis device, and a method for protecting electronic components of an analyzer against excessive electrical voltages.

One object of the invention is to provide an inexpensive arrangement as well as a method for safely discharging electrostatic charges in order to protect electrical circuits, in particular the analyzer of a control unit, against overvoltages at low cost.

The sensor unit according to the invention is suitable for installation in a motor vehicle or trailer. The term "trailer" encompasses a dolly with a semi-trailer coupling for accepting a semi-trailer. The sensor unit comprises a sensor measuring arrangement for sensing at least one physical variable, an electrically conductive sensor housing partly or fully enclosing the sensor measuring arrangement, and at least two connecting lines.

In certain embodiments, the sensor measuring arrangement comprises a part of the sensor unit that is necessary for detecting the measurement variable. In the case of a revolution rate sensor, for example, the sensor measuring arrangement may comprise a magnet for producing a magnetic flux and a coil for detecting changes of the magnetic flux. The sensor measuring arrangement of a temperature sensor may comprise a temperature-dependent resistance, for example PT100.

The sensor measuring arrangement can be connected to an analyzer via the connecting lines of the sensor unit. Furthermore, the sensor unit with the sensor housing can be electrically connected to a conductive part of the motor vehicle or trailer, for example the vehicle axle.

For discharging any electrostatic charge from the conductive part of the motor vehicle or trailer, the sensor unit comprises a predetermined discharge path between the electrically conductive sensor housing and a connecting line of the sensor unit or between the electrically conductive sensor housing and the sensor measuring arrangement of the sensor unit. Via the predetermined discharge path, advantageously the electrostatic charge can be output to the analyzer via the sensor measuring arrangement and/or a connecting line. In this case, the discharge path is dimensioned such that the discharge path comprises a threshold voltage that lies below the maximum permissible voltage of the analyzer that is connected to the sensor unit. Thus, the isolation voltage of the sensor unit is reduced so that the electrostatic charge can be advantageously discharged from the conductive part of the motor vehicle or trailer, for example the vehicle axle, via the analyzer without damaging the analyzer.

In certain embodiments, the predetermined discharge path is implemented as a predetermined spark gap between the sensor housing and a connecting line of the sensor unit or between the sensor housing and the sensor measuring arrangement of the sensor unit. Such a spark gap can be advantageously simple to construct.

In specific embodiments, the spark gap is formed by a first contact that is conductively connected to the sensor housing and by a second contact that is conductively connected to a connecting line or the sensor measuring arrangement of the sensor unit. The two contacts preferably lie opposite each other and are at a predetermined distance apart. By the design of the contacts and the spacing of the contacts from each other, the threshold voltage or breakdown voltage can advantageously be determined accurately when taking into account the medium disposed between the contacts.

In other embodiments, the predetermined discharge path is implemented as a varistor between the sensor housing and a connecting line of the sensor unit or between the sensor housing and the sensor measuring arrangement of the sensor unit. A varistor is a voltage-dependent resistance that is abruptly smaller above a defined threshold voltage, i.e. in the normal mode the resistance is very large and in the event of an overvoltage is very small with almost no delay, so that advantageously the electrostatic charge can be discharged. Such a discharge path can be advantageously simple to implement as a varistor within a sensor unit.

In specific embodiments including the varistor, the varistor comprises a threshold voltage that lies below the maximum permissible voltage of an analyzer that is connected to the sensor unit. The maximum permissible voltage of the analyzer is given in this case by the breakdown voltage of the weakest electrical component of the analyzer. By specifying the threshold voltage that is used, the electrostatic charge can advantageously be safely discharged from the conductive part of the motor vehicle or trailer, for example the vehicle axle, via the analyzer without damaging the analyzer in doing so.

In other embodiments, the predetermined discharge path is implemented as a high-impedance resistance between the sensor housing and a connecting line of the sensor unit or between the sensor housing and the sensor measuring arrangement. Such a discharge path is advantageously also simple to construct as a high-impedance resistance.

In specific embodiments including the high-impedance resistance, the high-impedance resistance between the sensor housing and a connecting line of the sensor unit comprises a resistance value of between 100 kΩ and 1000 kΩ. Owing to the high-impedance resistance, the electrostatic charge can advantageously be discharged from the conductive part of the motor vehicle or trailer, for example the vehicle axle, via the analyzer without damaging the analyzer.

In yet other embodiments, the predetermined discharge path is implemented as a high-impedance casting compound between the sensor housing and a connecting line of the sensor unit or between the sensor housing and the sensor measuring arrangement of the sensor unit. The sensor measuring arrangement of the sensor unit is preferably encapsulated in a casting compound based on epoxy or polyurethane. Such a discharge path is also advantageously simple to construct as a high-impedance casting compound.

In specific embodiments including the high-impedance casting compound, the high-impedance casting compound between the sensor housing and a connecting line of the sensor unit or between the sensor housing and the sensor measuring arrangement of the sensor unit comprises such a specific resistance as to produce a resistance value of the predetermined discharge path of between 100 kΩ and 1000 kΩ. For example, by enriching the casting compound with nickel particles and/or silver particles, the casting compound can be given a predetermined electrical conductivity. Owing to the high-impedance casting compound, the electrostatic charge can thereby advantageously be discharged from the conductive part of the motor vehicle or trailer, for example the vehicle axle, via the analyzer without damaging the analyzer.

In certain embodiments, the sensor unit is a revolution rate sensor. Because electrostatic charging occurs directly in the wheel area of a vehicle and such electrostatic charge cannot be specifically discharged since the chassis parts often have no conductive connection to the frame of the vehicle, the revolution rate sensors that are attached in the wheel area and the analyzer that is connected thereto are particularly at risk of overvoltages. If the revolution rate sensor is the sensor unit according to the invention, any electrostatic charge can advantageously be discharged from the conductive part of the motor vehicle or trailer without damaging the analyzer that is connected to the revolution rate sensor.

Furthermore, the present invention provides a sensing and analysis device, wherein the sensing and analysis device comprises at least one sensor unit described above and an analyzer, for example in an axle modulator of an electronic brake system.

The sensing and analysis device comprises a predetermined discharge path for discharging any electrostatic charge out of a conductive part of the motor vehicle or trailer, wherein the predetermined discharge path is disposed between the sensor housing of the sensor unit and a connecting line that connects the sensor measuring arrangement of the sensor unit to the analyzer, or between the sensor housing and the sensor measuring arrangement of the sensor unit.

Such a predetermined discharge path advantageously prevents the build-up of too much electrostatic charge within a conductive part of the motor vehicle or trailer that is connected to the sensor unit by reducing the electrostatic charge via the discharge path and via the analyzer. In this case, the discharge path according to the invention is designed so that the isolation voltage applied to the sensor unit is so low that the analyzer is not damaged by the charge that is being discharged.

In certain embodiments, the analyzer comprises a varistor that is arranged so as to protect the electronic components that are disposed in the analyzer against damage by overvoltage. The varistor thereby advantageously acts as a protection against induced overvoltages, because it has a high resistance in the normal mode, but in the event of an overvoltage is highly conductive and thereby absorbs the voltage peak.

In specific embodiments in which the analyzer comprises the varistor, the varistor is disposed in the analyzer between a connecting line to ground (GND) and a connecting line that connects the sensor measuring arrangement of the sensor unit to the analyzer. This arrangement of the varistor advantageously produces additional protection of the analyzer for the discharge path according to the invention, which is disposed in the sensor unit that is connected to the analyzer, against damage within the analyzer because of overvoltages that can arise owing to a spontaneous discharge of electrostatic charge.

In other embodiments, a predetermined spark gap is disposed in the analyzer between a connecting line to ground (GND) and a connecting line that connects the sensor measuring arrangement of the sensor unit to the analyzer. This spark gap may also advantageously used as protection against induced overvoltages. The spark gap is typically formed by two mutually opposed contacts. Owing to the design and arrangement of the mutually opposed contacts, when taking into account the medium disposed between the contacts a predetermined threshold voltage or breakdown voltage at which a discharge of the applied overvoltage occurs can be determined.

of the present invention further provides a motor vehicle, for example a commercial vehicle or trailer, wherein the motor vehicle or the trailer comprises at least one sensor unit as described above and/or at least one sensing and analysis device as described above. Such a motor vehicle or trailer advantageously requires fewer repairs because of faulty control units, the analyzer of which is electrically connected to at least one sensor unit, because the analyzer is advantageously protected against damage due to overvoltages via the discharge path according to the invention in the sensor unit.

Finally, of the present invention provides a method for protecting electronic components of an analyzer that is connected to a sensor unit via at least two connecting lines against excessive electrical voltages. For this purpose, the sensor unit comprises a sensor measuring arrangement for sensing at least one physical variable as well as a sensor housing partly or fully enclosing the sensor measuring arrangement. The sensor unit with the sensor housing is electrically connected to a conductive part of the motor vehicle or trailer, for example the vehicle axle.

The electrostatic charge present in the conductive part of the motor vehicle or trailer is advantageously discharged via a predetermined discharge path between the sensor housing and a connecting line that connects the sensor measuring arrangement of the sensor unit to the analyzer, or between the sensor housing and the sensor measuring arrangement of the sensor unit, while the measurement of the sensor itself is not affected.

An overvoltage protection device in the form of a discharge path according to the invention in the sensor unit is particularly simple and inexpensive to implement, because standardized circuits or analyzers can still be used for connecting to the sensor unit. The electrostatic charge can thus be discharged from the part of the motor vehicle or trailer to which the sensor unit is attached via the connecting line and the analyzer that is connected thereto, because the analyzer usually comprises a ground line that is connected to the frame of the vehicle. As a result, the electrostatic charge can advantageously no longer build up to the extent that would cause damage to the analyzer in the event of a discharge.

BRIEF DESCRIPTION OF THE DRAWING

The invention is described in greater detail below with reference to the accompanying figures, in which.

DETAILED DESCRIPTION

Figure 1:
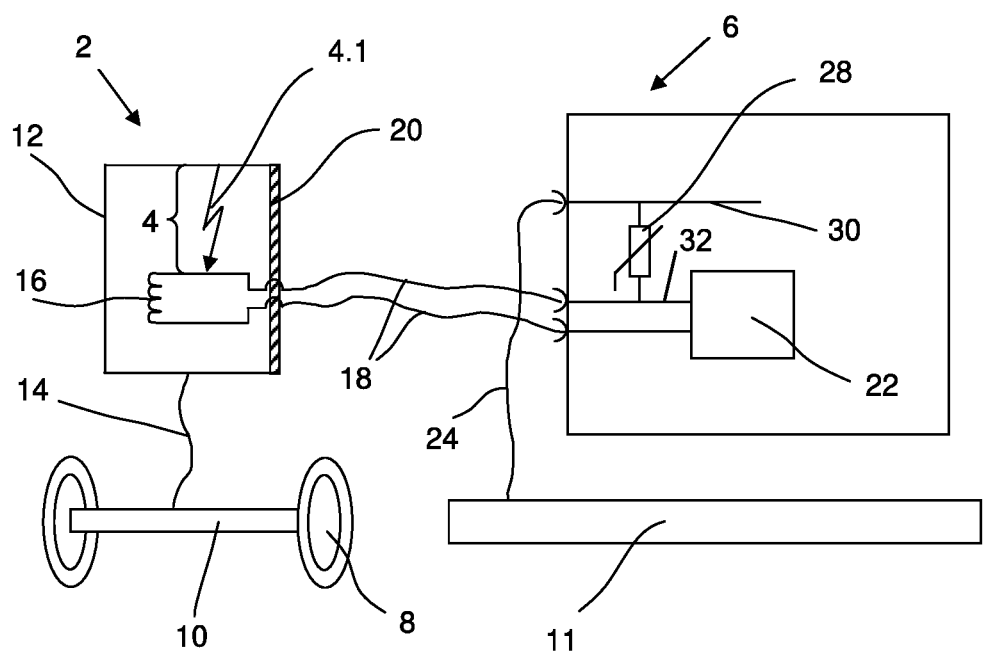
FIG. 1 shows a sensor unit with a discharge path implemented as a predetermined spark gap and an analyzer connected to the sensor unit.

With reference to the specific embodiment of the Figures, wherein like numerals generally indicate like parts throughout the several views, FIG. 1 shows a sensor unit 2 with a predetermined discharge path 4 and an analyzer 6 that is connected to the sensor unit 2.

Electrostatic charge is produced within a vehicle axle 10 by the friction from tires 8 while travelling, for example. Usually, however, the chassis parts of a motor vehicle or trailer, such as vehicle axles 10, are disposed electrically separately or isolated from a frame of a vehicle 11, which as a rule is at ground potential. As a result, electrostatic charge can arise especially in the wheel area of the motor vehicle or trailer, for example on the vehicle axle 10, wherein such charge can be discharged when a voltage limit is exceeded by flashing over to the nearest electrically conductive part of the motor vehicle or trailer.

If a sensor unit 2 is attached to the vehicle axle 10 so that there is a conductive connection 14 between a sensor housing 12 and the vehicle axle 10, the discharge takes place via the sensor unit 2 and possibly results in damage to the sensor unit 2 and/or to an analyzer 6 that is connected to the sensor unit 2.

In order to avoid such damage to the sensor unit 2 and/or analyzer 6, the sensor unit 2 comprises a discharge path 4 that is designed to reliably discharge an electrostatic charge present in the conductive part of the motor vehicle or trailer, for example the vehicle axle 10. For this purpose, the predetermined discharge path 4 is disposed between the electrically conductive sensor housing 12 and a sensor measuring arrangement 16 within the sensor housing 12.

The sensor unit 2 represented in FIG. 1 corresponds to a revolution rate sensor with a known sensor measuring arrangement 16. The sensor measuring arrangement 16 may comprise a magnet for producing a magnetic flux and a coil for detecting a change of the magnetic flux. The invention is however not limited to the use of revolution rate sensors as the sensor unit 2. Rather, any sensor units 2 that comprise an electrically conductive sensor housing 12 and that are connected via at least two connecting lines 18 to further electrical devices, such as an analyzer, are provided with a predetermined discharge path 4 in order to protect the electrical device that is connected via the connecting lines 18 to the sensor unit 2 against an overvoltage that was caused by an electrostatic charge, for example in the vehicle axle 10. Thus, temperature sensors, pressure sensors, acceleration sensors, etc. may also advantageously be provided with the discharge path 4 according to the invention.

The sensor unit 2 represented in FIG. 1 comprises an electrically conductive, pot-shaped sensor housing 12 that is closed by a closure part 20, from which the connecting lines 18 are fed out of the sensor unit 2. The connecting lines 18 are connected to the analyzer 6 via a plug connection and are fed within the analyzer 6 to an analysis circuit 22.

In this embodiment, the analyzer 6 is connected via a further electrical line 24 to the frame of the vehicle 11 as ground potential.

In order to protect the analyzer 6 in addition to the discharge path 4 against overvoltage, this can be provided with a voltage-dependent resistance 28, also known as a varistor. For this purpose, the varistor 28 may be disposed between a ground connecting line 30 and a connecting line 32 that is connected to a connecting line 18.

In the exemplary embodiment of the invention in FIG. 1, the predetermined discharge path 4 is implemented as a predetermined spark gap 4.1. The spark gap 4.1 is formed by a first contact that is conductively connected to the sensor housing 12 and a second contact that is conductively connected to a connecting line 18 of the sensor unit 2. In this case, the contacts are disposed opposite each other and are at a predetermined distance from each other.

The contacts in the sensor housing 12 are typically enclosed hermetically tight and the sensor unit 2 is filled with a gas. This has the advantage that the breakdown voltage of the spark gap 4.1 is independent of impurities, moisture and air pressure. Owing to the design of the contacts, the distance between the contacts and the choice of the gas disposed between the contacts, the breakdown voltage at which the electrostatic charge is discharged can advantageously be accurately determined. The breakdown voltage may be dimensioned so that the analyzer 6 is not damaged by the discharged charge.

Figure 2:
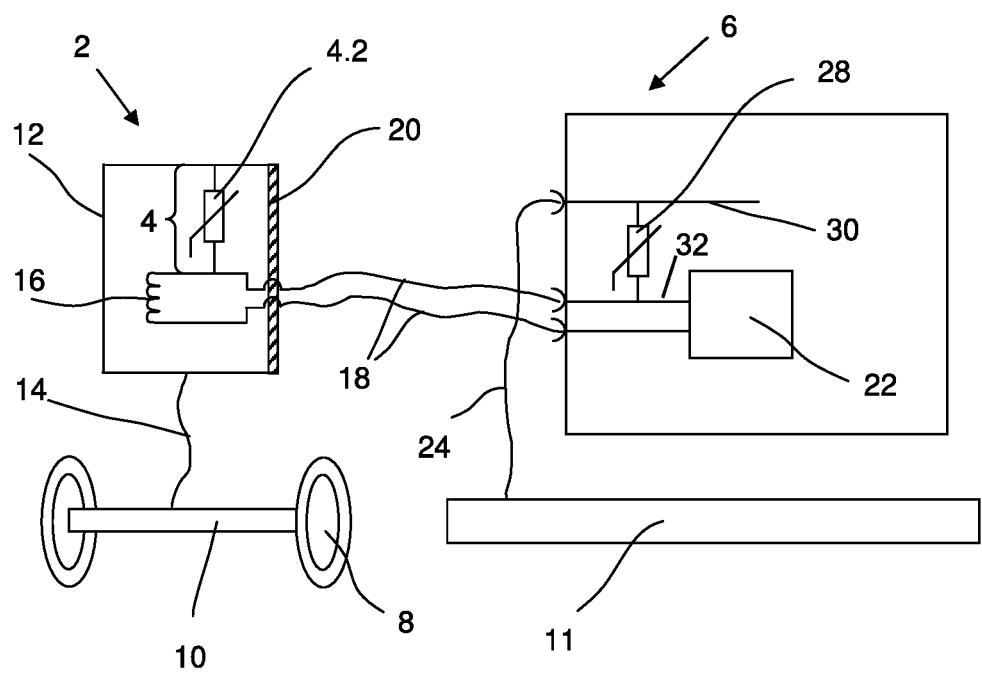
FIG. 2 shows a sensor unit with a discharge path implemented as a varistor and an analyzer connected to the sensor unit.

FIG. 2 shows an alternative design of the invention with which the predetermined discharge path 4 is implemented as a varistor 4.2 between the sensor housing 12 and a connecting line 18.

The varistor 4.2 is a voltage-dependent resistance that is abruptly smaller above a defined threshold voltage. In this case, the threshold voltage is typically selected so that it lies below the maximum permissible voltage of an analyzer 6 that is connected to the sensor unit 2. The maximum permissible voltage of the analyzer 6 is dependent here on the breakdown voltage of the weakest component of the analyzer 6. Thus, the electrostatic charge induced for example in the vehicle axle 10 can advantageously be discharged without damaging the analyzer 6, while the measurement of the sensor is not affected.

Figure 3:
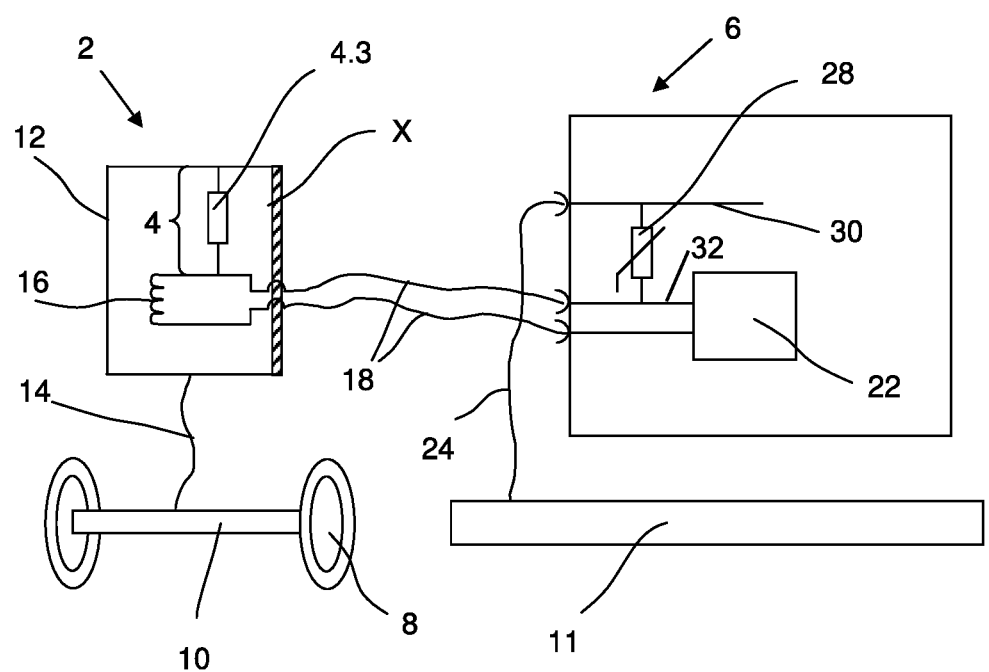
FIG. 3 shows a sensor unit with a discharge path implemented as a high-impedance resistance and an analyzer connected to the sensor unit.

FIG. 3 shows an alternative embodiment of the invention in which the predetermined discharge path 4 between the sensor housing 12 and a connecting line 18 is in the form of a high-impedance resistance 4.3.

The resistance 4.3 typically comprises a resistance value between 100 kΩ and 1000 kΩ and is dimensioned such that the electrostatic charge that is induced in the vehicle axle 10 for example can be discharged without damaging the analyzer 6.

Figure 4:
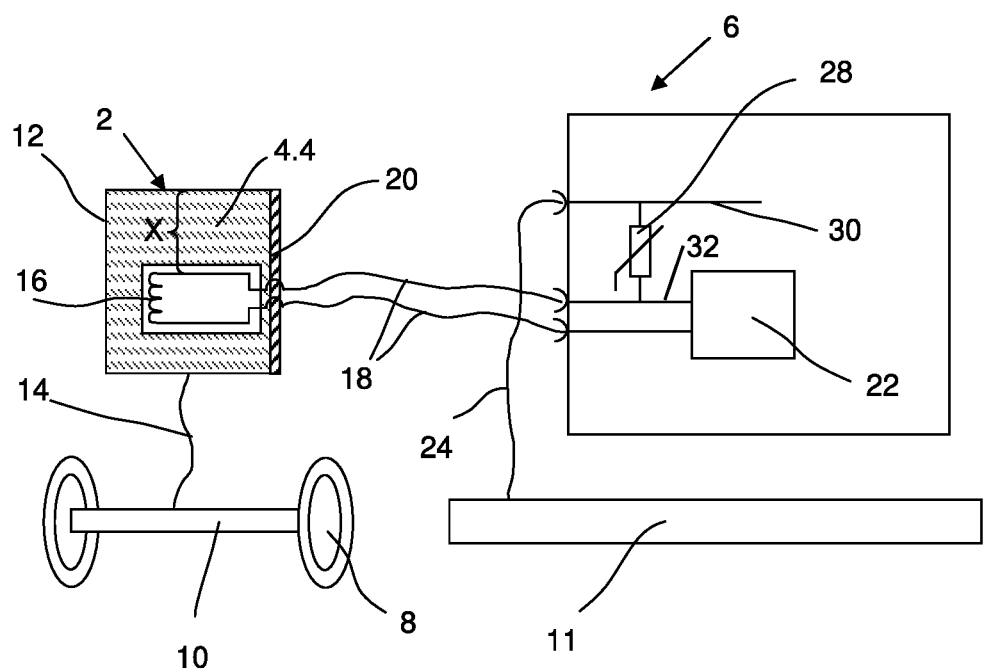
FIG. 4 shows a sensor unit with a discharge path implemented as a high-impedance casting compound and an analyzer connected to the sensor unit.

FIG. 4 shows an alternative embodiment of the invention in which the predetermined discharge path 4 between the sensor housing 12 and a connecting line 18 is implemented as a high-impedance casting compound 4.4.

The high-impedance casting compound 4.4 is typically implemented so as to comprise a specific resistance that forms a resistance value of the discharge path 4 of 100 kΩ to 1000 kΩ. The specific resistance is in this case dependent on enriching the casting compound 4.4 with conductive particles and the dimensions of the casting compound 4.4. The resistance of the high-impedance casting compound 4.4 is generally dimensioned so that the electrostatic charge that is induced in the vehicle axle 10 for example can be discharged without damaging the analyzer 6.

The alternative embodiments of the invention according to FIG. 1 through FIG. 4 described above differ only in the implementation of the embodiment of the discharge path 4 according to the invention. The functions of the discharge path 4 described under FIG. 1 thereby also apply analogously to the embodiments according to FIG. 2 through FIG. 4.

The discharge path 4 according to the invention can be implemented simply and inexpensively in the sensor unit 2, so that a sensing and analysis device of such a sensor unit 2 and an analyzer 6 connected thereto have reliable overvoltage protection.

All the features mentioned in the above description as well as in the claims can be combined with the features of the independent claims both individually and in any combination. The disclosure of the invention is therefore not limited to the described or claimed feature combinations. Rather, all feature combinations that are useful within the scope of the invention are to be considered as being disclosed.

What is claimed is:

1. A sensing and analysis device for a motor vehicle or trailer, wherein the sensing and analysis device comprises:
   a sensor unit including:
      a sensor measuring arrangement for sensing at least one physical variable,
      a sensor housing partly or fully enclosing the sensor measuring arrangement, and
      at least two connecting lines,
   an analyzer, wherein the sensor measuring arrangement of the sensor unit is connectable via the at least two connecting lines to the analyzer,
   wherein the sensor unit with the sensor housing are electrically connectable to a conductive part of the motor vehicle or trailer,
   wherein the sensor unit comprises a predetermined discharge path between the sensor housing and one of the at least two connecting lines or between the sensor housing and the sensor measuring arrangement for discharging electrostatic charge from the conductive part of the motor vehicle, and
   wherein the analyzer includes an analysis circuit coupled to the at least two connecting lines, the analyzer further including a ground connecting line that is coupled to one of the at least two connecting lines through a resistive element within the analyzer, the ground connecting line extending externally from the analyzer and coupled to a grounded portion of the motor vehicle or trailer for discharging electrostatic charge from both of the sensor measuring arrangement and the analyzer.

2. The sensing and analysis device as claimed in claim 1, wherein the predetermined discharge path is implemented as a predetermined spark gap between the sensor housing and one of the at least two connecting lines of the sensor unit or between the sensor housing and the sensor measuring arrangement of the sensor unit.

3. The sensing and analysis device as claimed in claim 2, wherein a first contact of the spark gap is conductively connected to the sensor housing and a second contact of the spark gap is conductively connected to one of the at least two connecting lines of the sensor unit, wherein the first and second contacts lie opposite each other and are at a predetermined distance from each other.

4. The sensing and analysis device as claimed in claim 1, wherein the predetermined discharge path is implemented as a varistor between the sensor housing and one of the at least two connecting lines of the sensor unit or between the sensor housing and the sensor measuring arrangement of the sensor unit.

5. The sensing and analysis device as claimed in claim 4, wherein the varistor comprises a threshold voltage that lies below the maximum permissible voltage of the analyzer when connected to the sensor unit, wherein the maximum permissible voltage is given by the breakdown voltage of the weakest electrical component of the analyzer.

6. The sensing and analysis device as claimed in claim 1, wherein the predetermined discharge path is implemented as a high-impedance resistance between the sensor housing and one of the at least two connecting lines of the sensor unit or between the sensor housing and the sensor measuring arrangement of the sensor unit.

7. The sensing and analysis device as claimed in claim 6, wherein the predetermined discharge path is implemented as a high-impedance resistance between the sensor housing and one of the at least two connecting lines of the sensor unit and wherein a resistance value of the high-impedance resistance between the sensor housing and one of the at least two connecting lines of the sensor unit is between 100 kΩ and 1000 kΩ.

8. The sensing and analysis device as claimed in claim 1, wherein the predetermined discharge path is implemented as a high-impedance casting compound between the sensor housing and one of the at least two connecting lines of the sensor unit or between the sensor housing and the sensor measuring arrangement of the sensor unit.

9. The sensing and analysis device as claimed in claim 8, wherein the predetermined discharge path is implemented as the high-impedance casting compound between the sensor housing and one of the at least two connecting lines of the sensor unit and wherein the high-impedance casting compound has a specific resistance as to produce a resistance value of the predetermined discharge path between 100 kΩ and 1000 kΩ.

10. The sensing and analysis device as claimed in claim 1, wherein the sensor unit is a revolution rate sensor.

11. The sensing and analysis device as claimed in claim 1, wherein the resistive element comprises a varistor that is disposed so as to protect electronic components that are disposed in the analyzer against damage by overvoltage.

12. The sensing and analysis device as claimed in claim 11, wherein the varistor is disposed in the analyzer between the ground connecting line and the one of the at least two connecting lines that connects the sensor measuring arrangement of the sensor unit to the analyzer.

13. The motor vehicle or trailer, comprising the sensing and analysis device as claimed in claim 1.

14. The motor vehicle or trailer, comprising the sensing and analysis device as claimed in claim 11.

15. A method for protecting electronic components of an analyzer that is connected to a sensor unit via at least two connecting lines against excessive electrical voltages due to electrostatic charging, wherein the sensor unit comprises a sensor measuring arrangement for sensing at least one physical variable and a sensor housing partly or fully enclosing the sensor measuring arrangement and wherein the sensor unit with the sensor housing is electrically connected to a conductive part of a motor vehicle or trailer, said method comprising discharging electrostatic charge from the conductive part of the motor vehicle or trailer via a predetermined discharge path between the sensor housing of the sensor unit and one of the at least two connecting lines that connects the sensor measuring arrangement of the sensor unit to the analyzer and further through a resistive element connected between one of the at least two connecting lines and a ground connecting line, the ground connecting line extending externally from the analyzer and coupled to a grounded portion of the motor vehicle or trailer for discharging electrostatic charge from both of the sensor measuring arrangement and the analyzer.

* * * * *